(12) United States Patent
Scanlon et al.

(10) Patent No.: US 7,544,335 B2
(45) Date of Patent: Jun. 9, 2009

(54) FLOATING TOP COVER PLATE ASSEMBLY FOR RADIAL FLOW REACTORS

(75) Inventors: Geoffrey E. Scanlon, Humble, TX (US); Daniel B. Knorr, Jr., Humble, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 764 days.

(21) Appl. No.: 11/136,874

(22) Filed: May 25, 2005

(65) Prior Publication Data

US 2006/0269461 A1     Nov. 30, 2006

(51) Int. Cl.
*B01J 8/02*     (2006.01)
*B01J 35/02*    (2006.01)

(52) U.S. Cl. .................. 422/218; 422/220; 422/221
(58) Field of Classification Search .................. 422/218, 422/220, 221
See application file for complete search history.

(56) References Cited

U.S. PATENT DOCUMENTS

| | | | |
|---|---|---|---|
| 3,706,536 A | 12/1972 | Greenwood et al. | |
| 3,925,025 A | 12/1975 | Greenwood et al. | |
| 4,244,922 A * | 1/1981 | Burke et al. | 422/218 |
| 4,421,723 A | 12/1983 | Farnham | |
| 5,366,704 A | 11/1994 | Koves et al. | |
| 6,224,838 B1 | 5/2001 | Schultz et al. | |

* cited by examiner

*Primary Examiner*—Walter D Griffin
*Assistant Examiner*—Lessanework Seifu
(74) *Attorney, Agent, or Firm*—Conley Rose, P.C.; Rodney B. Carroll; Daniel E. Burke

(57) ABSTRACT

A radial flow reactor comprising a floating top cover plate assembly. A method of operating a radial flow reactor comprising floating a top cover plate assembly within the reactor.

23 Claims, 4 Drawing Sheets

FLOATING TOP COVER PLATE ASSEMBLY FOR RADIAL FLOW REACTORS

CROSS-REFERENCE TO RELATED APPLICATIONS

Not Applicable.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present invention generally relates to the internals of reactors for contacting fluids and particulate materials. More specifically the invention relates to top cover plate assembly designs in a radial flow reactor that allows for thermal expansion of reactor internals.

BACKGROUND OF THE INVENTION

In radial flow processes, the reactor typically comprises scallop-shaped conduits or screens, hereinafter referred to as "scallops", installed adjacent to and vertically along the inside wall of a cylindrical reactor. The scallops are typically 8 to 14 inches wide and designed with a scallop-like cross-sectional shape (e.g., semi-circular or arced) to fit against the inside wall of the reactor. After installation and catalyst loading, the scallops distribute a hydrocarbon feed along the inside wall. The feed then flows radially to the center of the reactor across a fixed catalyst bed. In the center of the reactor is the process outlet conduit, which is a vertical perforated pipe, also referred to as a center pipe.

The base of each scallop rests in a fixed bottom wall ring just above the bottom head of the reactor and extend almost the full length of the inside vertical wall of the reactor. Just below and inside the top head of the reactor are cover plates that traditionally are bolted to the center pipe and extend in a pie shaped fashion from the center pipe to the top of the scallops. These cover plates help seal the top side of the catalyst bed and distribute incoming flow of hydrocarbon feed gas into the scallops. As a result, the reactor scallops are firmly confined between the top cover plates and the bottom wall ring.

As the reactor internals (e.g., the scallops and the center pipe) are heated, they may expand longitudinally from thermal expansion. Often a radial temperature gradient exists across the catalyst bed. When an endothermic reaction occurs in the catalyst bed the temperature near the reactor walls may be higher than at the center pipe. As a result, the scallops may be subjected to a higher temperature and experience a greater longitudinal expansion than the center pipe that is at a lower temperature. Because of the greater expansion of the scallops relative to the center pipe, the scallops may be subjected to a compressive force between the bottom wall ring and the top cover plates, which may cause deformation of the scallops. This deformation results in a "bowing" of the scallops away from the wall of the reactor which crushes catalyst, disrupts the feed flow patterns, and allows catalyst to migrate between the scallops and the reactor wall. All of these are undesirable. Furthermore, the bowed scallops require extensive repair or replacement. Therefore, there is a need in the art for alternative top cover plate designs for radial flow reactors to allow for thermal expansion of the reactor internals.

SUMMARY OF THE INVENTION

Disclosed herein is a radial flow reactor having a floating top cover plate assembly. Further disclosed herein is a method of operating a radial flow reactor comprising a floating top cover plate assembly within the reactor.

DETAILED DESCRIPTION OF THE PREFERRED EMBODIMENTS

Figure 1:
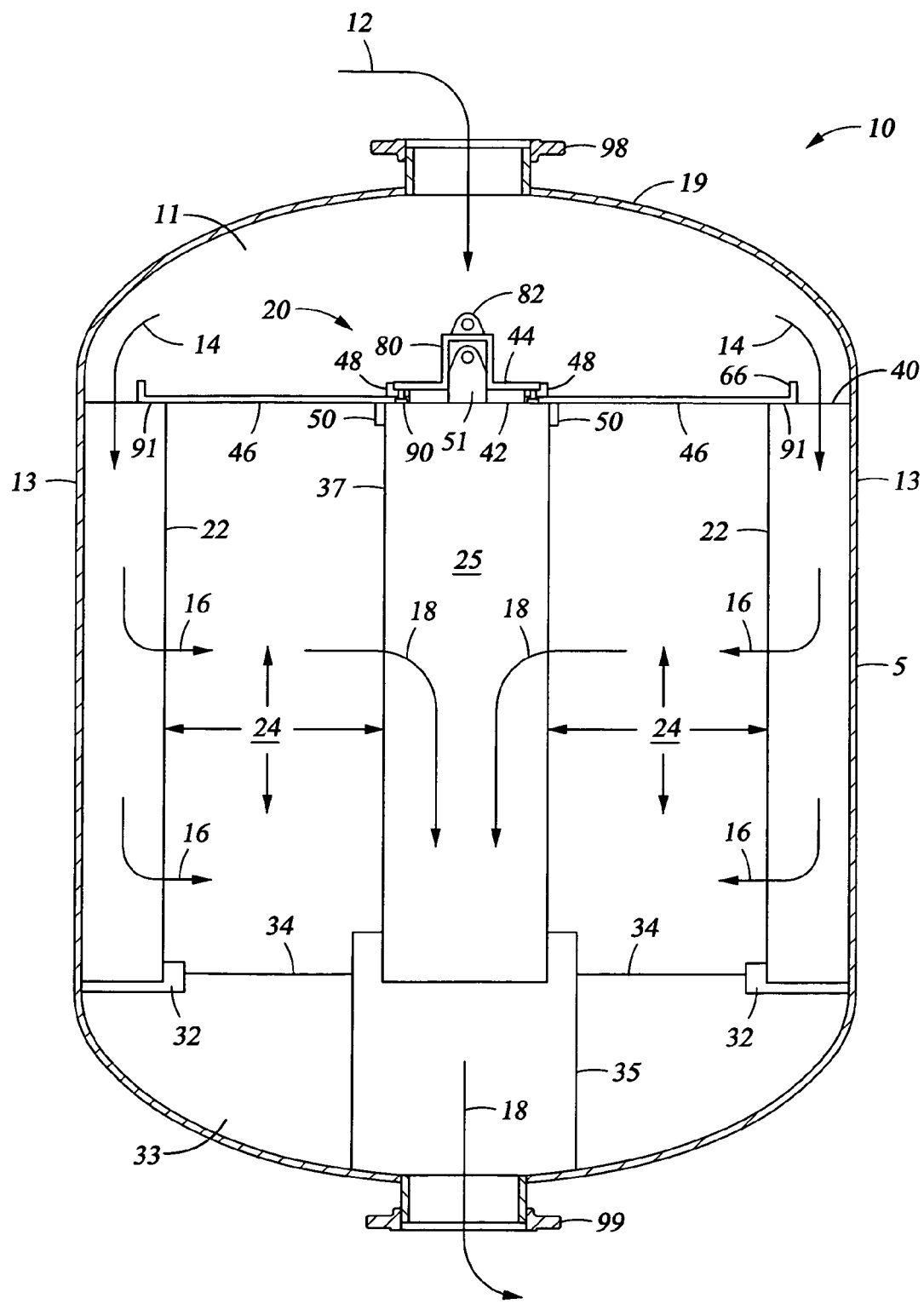
FIG. 1 is a cross-sectional elevation view of an embodiment of a floating top cover plate assembly for a radial flow reactor.

FIG. 1 is a cross-sectional elevation view illustrating the internals of a radial flow catalytic reactor 10 comprising: a generally cylindrical reactor vessel 5 having sidewalls 13, a top head 11 having inlet 98, and a bottom head 33 having outlet 99; a catalyst bed 24 disposed within reactor vessel 5 and supported by a plate 34; a cylindrical center pipe 25 extending vertically and axially through bed 24; a plurality of scallops 22 positioned adjacent to sidewalls 13 to provide annular space between the outer circumference of the catalyst bed 24 and sidewall 13; and a top cover plate assembly 20 resting atop the scallops 22 and/or the center pipe 25. To support the center pipe 25 in a vertical position and substantially coaxial with the reactor 10, a support seat 35 is positioned at the base of reactor 10 and extends through plate 34. The base of the scallops 22 rest in a fixed bottom wall ring 32 located near the bottom head 33 of the reactor 10, at about the same elevation as the bottom of center pipe 25. Any suitable scallop type and configuration may be used, such as those described in U.S. Pat. Nos. 5,366,704 and 6,224,838 B1, incorporated by reference herein in their entirety.

Figure 5:
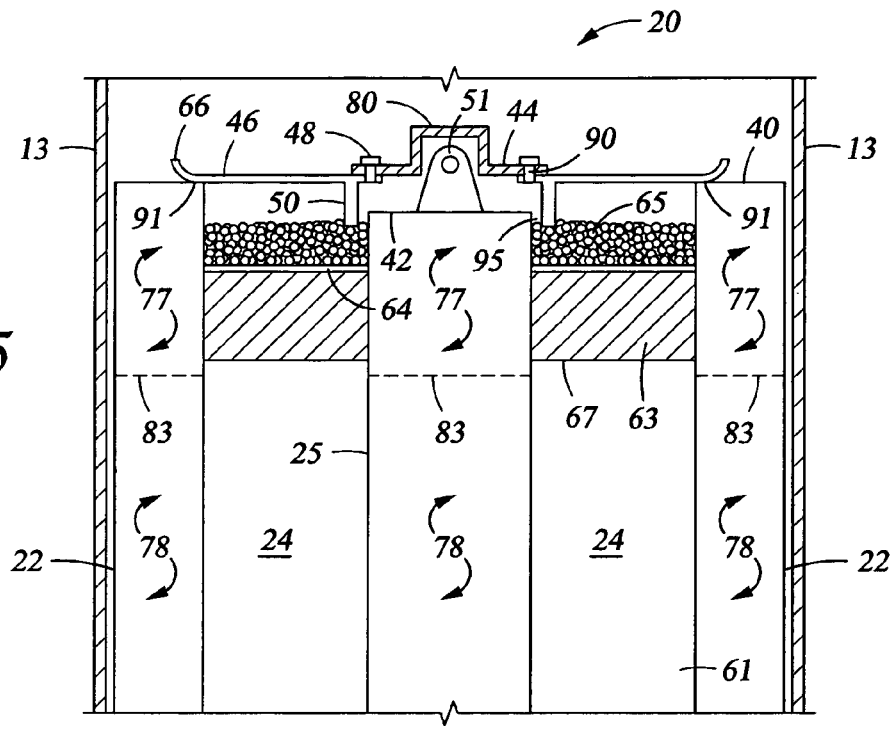
FIG. 5 is a cross-sectional elevation view of another embodiment of a floating top cover plate assembly in a radial flow reactor.
Figure 6:
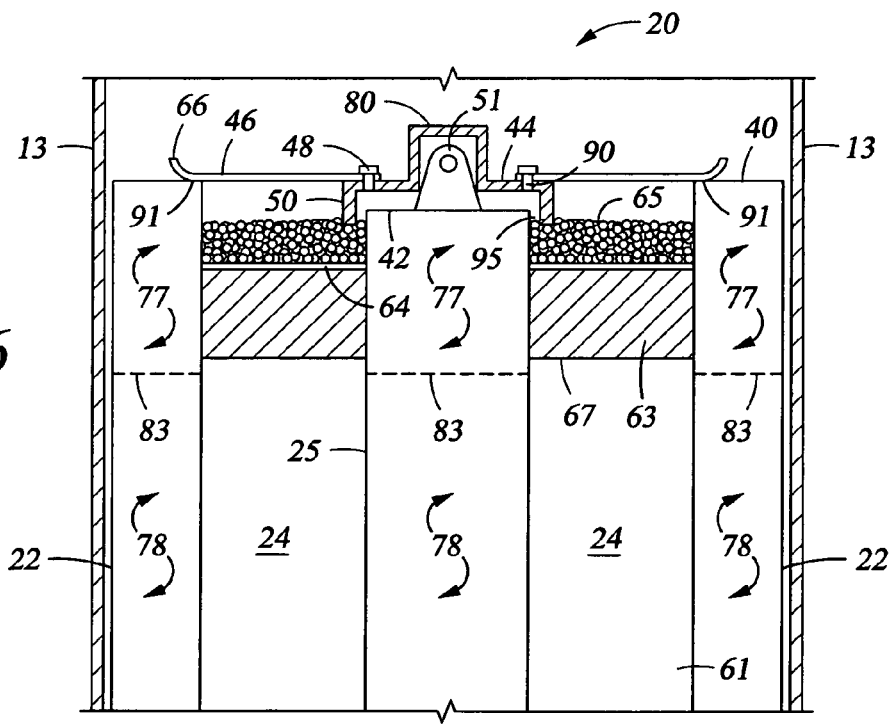
FIG. 6 is a cross-sectional elevation view of another embodiment of a floating top cover plate assembly in a radial flow reactor.

As shown in FIGS. 5 and 6, the catalyst bed 24 may comprise a layer 61 of catalyst particles, topped by a catalyst seal layer 63, topped by a screen 64, topped by a layer 65 of ceramic balls. The center pipe 25 and scallops 22 have a non-permeable zone 77 located above a permeable zone 78, and the lower edge 67 of catalyst seal layer 63 is positioned above the interface 83 between the permeable and non-permeable zones, thereby sealing and precluding undesired fluid flow upward in the reactor.

Fluid reactants, for example a preheated hydrocarbon feed, may flow through reactor 10 as indicated by arrows 12, 14, 16, and 18 as shown in FIG. 1. In reactor 10, fluid reactants enter via inlet 98 as shown by arrow 12 and flow downwardly into the top head 11, where the reactants are diverted to the sidewall 13 by the top cover plate assembly 20 and flow downwardly into the annular space between the scallops 22 and the sidewall 13 as demonstrated by arrow 14. From the annular space, the fluid reactants flow radially inward through the catalyst bed 24 toward the permeable zone 78 (see FIG. 5) of center pipe 25 as shown by arrows 16. The fluid reactants pass through the catalyst bed 24, making contact with the solid catalyst particles and undergoing a catalyzed reaction to form a reaction product, including at least one desired compound. The reaction product and any unreacted reactants exit the catalyst bed and permeate across and flow downwardly through center pipe 25, as shown by arrows 18, and exit reactor 10 via outlet 99 at the bottom of the vessel.

In an embodiment, the top cover plate assembly 20 is "floating", meaning that at least a portion of the top cover plate assembly 20 is free to move vertically up or down from an initial point within the reactor to another point within the reactor in response to the thermal expansion or contraction of at least one of the reactor internals (e.g., the scallops, the center pipe, or both). As used herein, the top cover plate assembly 20 is said to have floated once the top cover plate assembly has moved vertically from an initial point within the reactor upon heating from ambient temperatures. Once the top cover plate assembly 20 has floated, due to thermal expansion of at least one of the reactor internals, it is possible that the top cover plate assembly may return to the initial point upon cooling to ambient temperatures.

In an embodiment, the top cover plate assembly 20 is at an initial point resting atop the scallops, the center pipe, or both and floats in response to thermal expansion or contraction of the scallops, the center pipe, or both. In an embodiment, the top cover plate assembly 20 may rest upon and not be mechanically attached to the scallops, the center pipe, or both. In an embodiment, top cover plate assembly 20 is floated above the center pipe in response to longitudinal thermal expansion of the scallops 22 that is greater than the longitudinal expansion of the center pipe 25. In some embodiments, differences in thermal expansion between the scallops 22, and the center pipe 25 can be attributed to a radial temperature gradient across the reactor. In an embodiment, the scallops 22 expand longitudinally an amount greater than the center pipe 25, yet deformation of the scallops 22 does not occur due to the top cover plate assembly 20 floating above the center pipe 25. In an embodiment, the center pipe 25 expands longitudinally an amount greater than the scallops 22 yet contact 91 between the top cover plate assembly 20 and the scallops 22 is maintained due to the top cover plate assembly 20 floating above the centerpipe 25. In an embodiment, the center pipe 25 expands longitudinally an amount greater than the scallops 22, thereby floating the top cover plate assembly 20 above the scallops 22. In some embodiments, differences in thermal expansion between the scallops 22, and the center pipe 25 can be attributed to the scallops 22 and center pipe being constructed out of materials having different coefficients of expansion. In an embodiment, the top cover plate assembly 20 floats in response to cycles of thermal expansion and contraction of the reactor and a plurality of reactor internals. These thermal cycles occur during the lifetime of a radial flow reactor and are associated with shutdowns and restarts for a number of reasons including but not limited to maintenance activities, market conditions, safety inspections, or dangerous weather conditions.

As shown in FIG. 1, the top cover plate assembly 20 rests atop and is in contact with the center pipe 25, the scallops 22, or both and is not mechanically fixed or connected to the center pipe 25, the scallops 22, or both. The top cover plate assembly 20 may or may not be in contact with at least one layer of the catalyst bed 24 (e.g., layer 65 of ceramic balls). When in a cold state, that is when thermal expansion has not occurred, as shown in FIG. 1, the top 40 of the scallops 22 and the top 42 of the center pipe 25 are at about the same height or elevation. In another embodiment, when in a cold state the top 40 of the scallops 22 may be at an elevation above the top 42 of the center pipe 25 to account for the thickness of one or more components such that the top cover plate assembly 20 may rest substantially horizontally across the top of the scallops 22 and the center pipe 25.

Upon heating and thermal expansion of the scallops 22, the center pipe 25, or both, the top cover plate assembly 20 will float upward in the reactor. In an embodiment, the scallops 22 are at a higher temperature than the center pipe 25 and may thermally expand longitudinally an amount greater than the center pipe 25 thereby lifting and floating the top cover plate assembly 20 above the center pipe 25. The higher temperature of the scallops 22 relative to the center pipe 25 may be due to a radial temperature gradient across the reactor wherein the temperature decreases from the reactor sidewalls 13 to the reactor center pipe 25 due to the endothermic nature of reforming reactions. In an embodiment, the radial temperature drop across the reactor 10 may be in a range of from about 50 to about 200° F.; alternatively from about 150 to about 200° F. In an embodiment, the scallops 22 are heated to a temperature of from about ambient to about 1050° F.

In an embodiment, when the thermally expanded scallops 22 have floated the top cover plate assembly 20, the linear compressive load acting upon each scallop may include a dead load of less than or equal to about 8 pounds per circumferential inch; alternatively less than or equal to about 5 pounds per circumferential inch. The term pounds per circumferential inch is a term known to the skilled artisan for load resolution on a circular part or structure. The linear compressive load acting on each scallop may include a differential pressure load of less than or equal to about 31 pounds per circumferential inch, alternatively less than or equal to about 26 pounds per circumferential inch. The total linear compressive load acting on the scallops 22 may be less than or equal to about 400 pounds per circumferential inch; alternatively less than or equal to about 300 pounds per circumferential inch. In an embodiment, the total linear compressive load acting on the scallops 22 may be less than the force necessary to cause bending, buckling or other deformations of the scallops, thus preserving the integrity of the scallops.

As the scallops 22, thermally expand, thereby floating the top cover plate assembly 20, upward fluid flow from the catalyst bed 24, remains precluded via the catalyst seal layer 63 and continued contact 91 between top cover plate assembly 20 and the top 40 of scallops 22. Also, during operation of reactor 10 in which feed enters the inlet 98 at the top and exits the outlet 99 at the bottom of reactor 10, the pressure on the inlet side of the top cover plate assembly 20 may be greater than the pressure below the assembly 20. This pressure differential along with the weight of the plate assembly 20 maintains the top cover plate assembly 20 in a sealing position atop the scallops 22. In an embodiment, the pressure differential across the top cover plate assembly 20 may be less than or equal to about 40 psig and greater than or equal to about 0.5 psig; alternatively, less than or equal to about 30 psig and greater than or equal to about 1 psig, alternatively less than or equal to about 20 psig and greater than or equal to about 3 psig.

Figure 2:
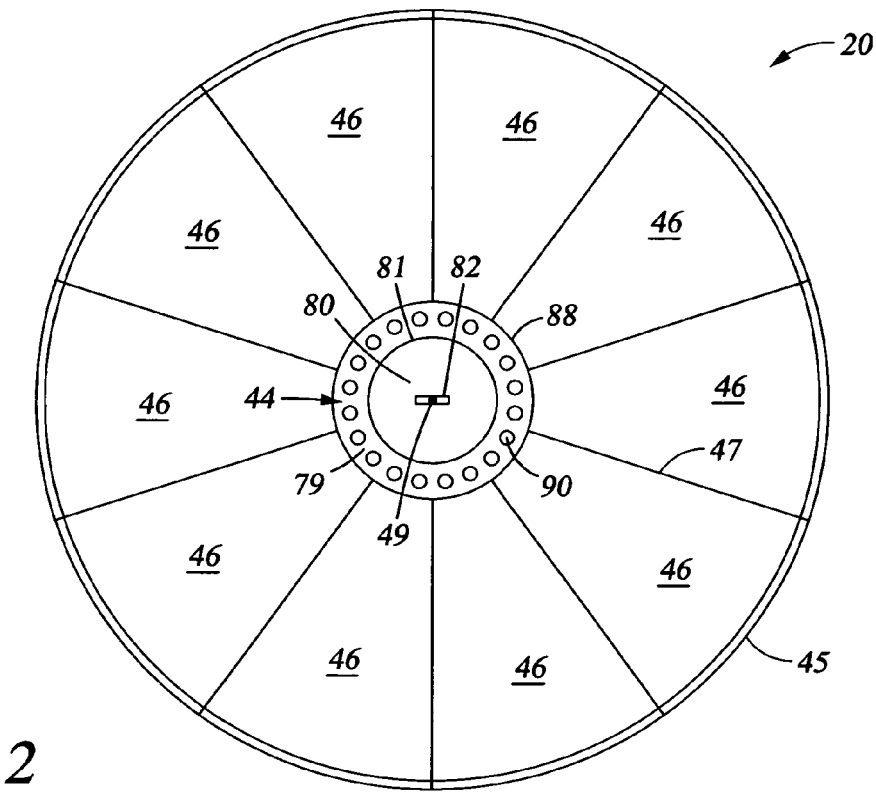
FIG. 2 is a top view of an embodiment of a floating top cover plate assembly.

In an embodiment, as shown in FIGS. 1 and 2, the top cover plate assembly 20 comprises a central hub 44 and a plurality of horizontally, radially extending pie-shaped plates 46 arranged side-by-side to form a circular shaped assembly.

The central hub 44 is connected to the pie-shaped plates 46 via an optional bolting ring 48 and connectors 90. The connectors 90 can be any suitable fastening system such as bolts, rivets, welds, staples, cables, etc. In an alternative embodiment, welding can fasten the central hub, pie-shaped plates, and optional bolting ring; either as a continuous weld or via a number of spot or discontinuous welds. In an embodiment, the central hub 44 may rest atop and/or cover the top of the center pipe 25. In FIG. 1, the optional bolting ring 48 is disposed between the pie-shaped plates 46 and the central hub 44, with the central hub 44 above the optional bolting ring 48. Alternatively, the central hub 44 can be below the optional bolting ring. In an embodiment, the top cover plate assembly 20 comprises a plurality of pie-shaped plates 46 connected to a central hub 44, the central hub 44 positioned above the center pipe 25 and the plurality of pie-shaped plates 46 resting atop the plurality of scallops 22. In alternative embodiments, the optional bolting ring 48 may be positioned above the central hub 44, which is positioned above the pie-shaped plates 46 (see FIG. 5); the optional bolting ring 48 may be positioned above the pie-shaped plates 46, which are positioned above the central hub 44 (see FIG. 6); the optional bolting ring 48 may be positioned below the central hub 44, which is positioned below the pie-shaped plates 46 (not shown); the optional bolting ring 48 may be positioned below the pie-shaped plates 46, which are positioned below the central hub 44 (not shown), or the pie-shaped plates 46 may be placed above the central hub 44 with the optional bolting ring 48 positioned between the pie-shaped plates 46 and the central hub 44 (not shown). The central hub 44 may be designed to accommodate a center pipe lug 51, for example via a receptacle such as that formed by the "top hat" configuration as shown in FIG. 1 or via an opening or hole in the central hub 44 (not shown). The center pipe lug 51 may be present to aid in removing the center pipe 25 when servicing the reactor 10.

Figure 4:
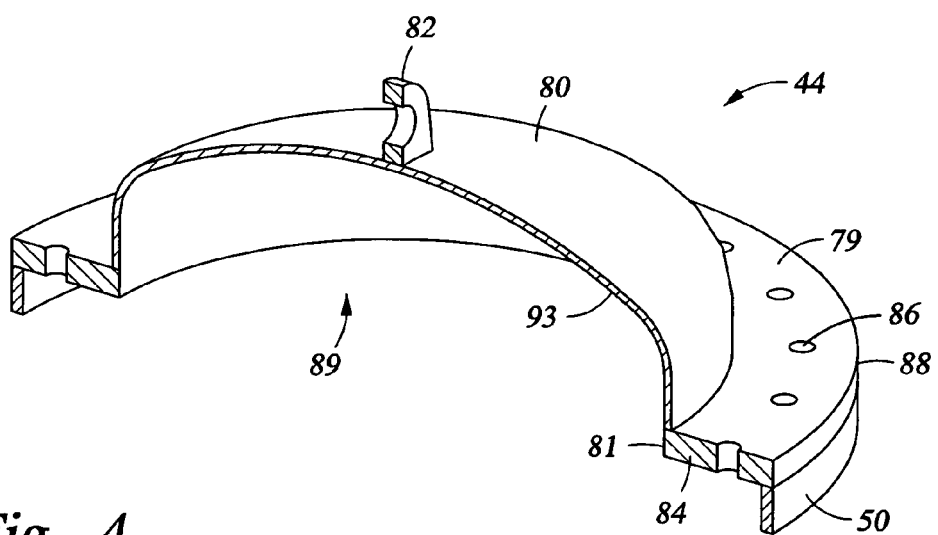
FIG. 4 is a perspective, cross-sectioned view of an embodiment of a central hub.
Figure 3A:
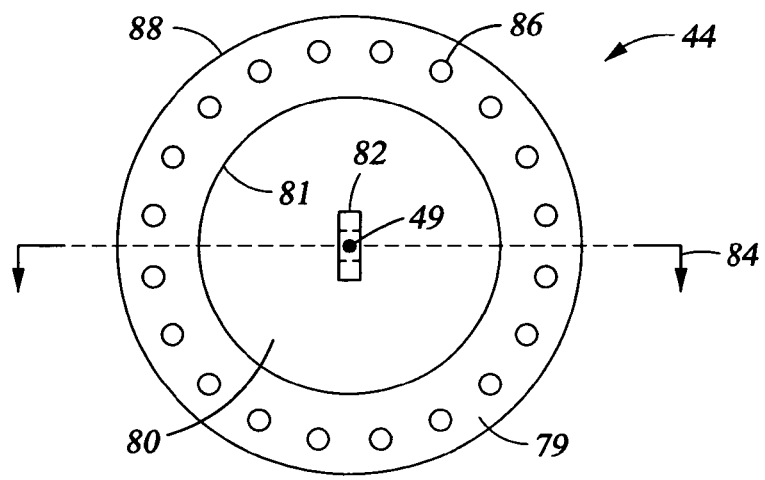
FIG. 3A is a top view of a central hub.

As shown in FIGS. 2, 3A, and 4, the central hub 44 comprises a head portion 80 defining head space 89 (for fitting over center pipe lug 51 as shown in FIG. 1) surrounded by a horizontally extending exterior edge ring 79 with a cross-section 84. As shown in overhead view in FIG. 3A, the central hub 44 may be circular in shape with the edge ring 79 having an outer circumferential edge 88. Likewise, head portion 80 may be circular in shape with the interior edge 81 forming the inner circumferential edge of the exterior edge ring 79. The exterior edge ring 79 comprises a plurality of openings, e.g., about equally spaced holes 86, for receiving connectors 90. The connectors 90 can be any fastening system known in the art, such as bolts rivets or welds. The edge ring 79 may further comprise an optional guide 50 connected to and extending vertically downward from about the outer circumferential edge 88. The optional guide 50 may have the same or similar shape as the horizontally extending exterior edge ring 79, for example circular to match outer edge 88 of edge ring 79. As shown in FIG. 4 along the cross-section 84, the central head portion 80 may have an elliptical cross section 93. Alternatively, the central head portion 80 may have a square or rectangular shaped head portion 80 as shown in FIGS. 1, 5, and 6. In alternative embodiments, the central hub 44 (e.g., defined by edge ring 79 and/or guide 50), head portion 80, or both may have other shapes and cross-sections, both vertical and horizontal, as desired. The head portion 80 may further comprise a centrally located lug 82 attached, e.g., welded, to the top of head portion 80 which may be used for attaching with a hoisting chain for removing the top cover plate assembly 20 when removing the reactor internals for servicing the reactor.

Figure 3B:
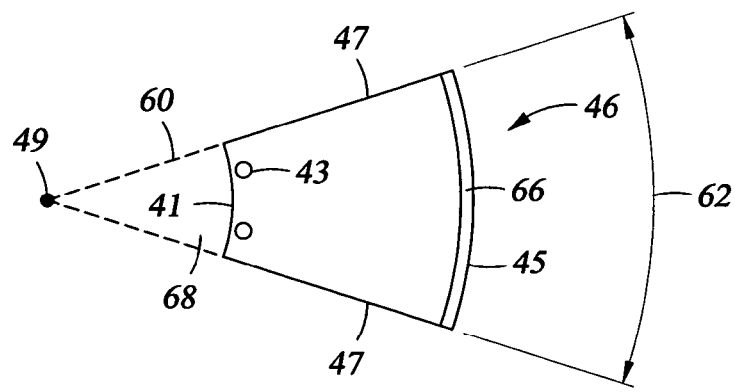
FIG. 3B is a top view of a pie-shaped plate.

FIG. 3B illustrates a top view of a pie-shaped plate 46. In an embodiment, the pie-shape of plate 46 is formed by sweeping a radius 60 extending from a center point 49 across an angle 62, thereby defining an arced inner edge 41, an arced outer edge 45, and generally straight side edges 47. A portion 68 of the pie-shape may be cropped such that the arc of inner edge 41 is about equal to a corresponding arc of the edge ring 79 and/or the optional bolting ring 48. As shown in FIG. 1, the pie-shaped plates 46 may be relatively thin and flat, may have a lip 66 extending upward near the outer edge 45, which acts to stiffen and strengthen the outer edge of the pie-shaped plates 46, and may have an optional guide 50 extending downward near the inner edge 41. The pie-shaped plate 46 may have one or more holes 43 corresponding with the hole pattern of the edge ring 79 and/or the optional bolting ring 48.

Figure 3C:
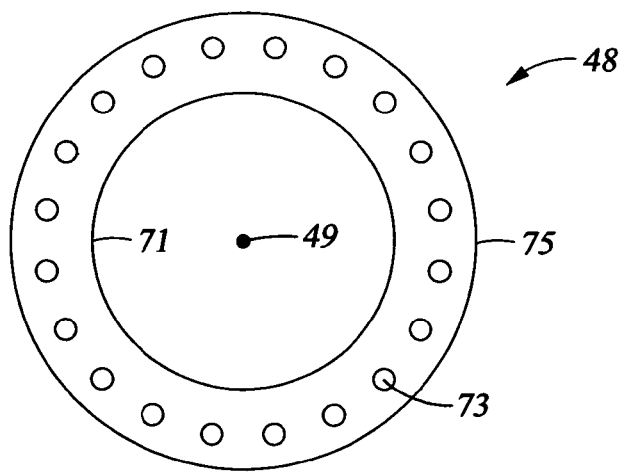
FIG. 3C is a top view of a central bolting ring.

FIG. 3C illustrates a top view of the optional bolting ring 48 having an inner edge 71, and outer edge 75, and a plurality of holes 73 corresponding in number and position to the holes 86 in the central hub 44. With reference to a common center point 49, the edge ring 79 and/or the optional bolting ring 48 are about the same size and shape and the plurality of holes 73 in the optional bolting ring 48 correspond in number and position to the holes 86 in the edge ring 79 and holes 43 in pie-shaped plates 46, allowing for alignment and connection of the components to form the top cover plate assembly 20 as described herein via connectors 90. In an alternative embodiment, threaded studs are attached to the edge ring 79, pie-shaped plates 46, or optional bolting ring 48 and correspond in number and position to the holes 73.

In an embodiment the top cover plate assembly 20 additionally includes one or more guides 50 for centering the top cover plate assembly 20 relative to the center pipe 25, particularly during the operation of reactor 10 as thermal expansion of the scallops 22 may result in the top cover plate assembly 20 floating relative to the center pipe. In an embodiment, a continuous guide 50 or a plurality of segmented guides 50 may optionally extend downward from top cover plate assembly 20 adjacent the outer edge 37 of center pipe 25 and generally outline the shape thereof (e.g., a circular guide or plurality of guides having an inner diameter greater than the outer diameter of the center pipe 25). In embodiments shown in FIGS. 1 and 5, a segmented guide 50 is optionally attached to and/or integral with one or more of the plurality of pie-shaped plates 46 and located near the inner edge 41 thereof. In embodiments shown in FIGS. 4 and 6, guide 50 is a continuous (or alternatively discontinuous) ring attached to and/or integral with the bottom of central hub 44, located near outer circumferential edge 88, and extending vertically downward therefrom. In an alternative embodiment (not shown), the optional segmented guide 50 is a continuous (or alternatively discontinuous) ring attached to and/or integral with the optional bolting ring 48, and extending vertically downward therefrom. In an alternative embodiment (not shown), the guides 50 are provided by a separate guide ring that may be connected to the underside of the top cover plate assembly 20, via extension of one or more connectors 90.

The optional guides 50 may be connected to the top cover plate assembly 20 or component thereof by any suitable means such as bolting, welding, or integral formation (e.g., molding, casting, etc.). In an optional embodiment, the guides 50 and the center pipe 25 form a close fitting relationship, for example having a spacing 95 small enough to restrict entry of particulate (e.g., ceramic balls 65) from catalyst bed 24. In an embodiment the inner diameter of the guides 50 may be equal to or less than about 1½ inches greater than the outer diameter of the center pipe 25; alternatively equal to or less than about 1 inch greater than the outer diameter of the center pipe 25.

The thickness of the steel used to fabricate the components comprising the top cover plate assembly 20 may be selected to minimize the bending moment across the top cover plate assembly 20 during floating. In an embodiment, the top cover plate assembly 20 may be fabricated using ¾ inch thick 347 stainless steel. Additionally, in an embodiment the top cover plate assembly 20 may be coated with a protective coating to prevent carburization, for example a metal protective layer.

The top cover plate assembly 20, center pipe 25, scallops 22, and catalyst in bed 24 may be removable, as through a manway in upper end wall 19 of FIG. 1 for servicing reactor 10. Accordingly, each component of the top cover plate assembly 20 may be sized to be removed from reactor 10 via the manway and may be removed as such by first disassembling the components prior to removing.

The central hub 44, pie-shaped plates 46, and optional bolting ring 48 may be aligned and connected together in configurations as described herein using connectors 90 to form the rigid top cover plate assembly 20. The holes in the central hub 44, pie-shaped plates 46, and optional bolting ring 48 may be formed by any suitable means, for example by drilling or torching. The connectors can be any suitable fastener, for example bolts, non-integral bolts and nuts; integral bolts extending from one or more of the components; integral tapped threads in any of holes 86, 43, or 73; or combinations thereof. In an embodiment, holes may be drilled in both the central hub 44 and the short ends (corresponding to edge 41) of the pie-shaped plates and then all connecting pieces aligned accordingly and connected with separate bolt and nut assemblies or other suitable fastening means passing through all three aligned pieces. Alternatively, holes may be drilled in the central hub 44 while the short ends (corresponding to edge 41) of the pie-shaped plates 46 may have corresponding fixed bolts for connecting the aligned pieces with separate nuts. Alternatively, holes may be drilled in the short ends (corresponding to edge 41) of the pie-shaped plates 46 and the central hub 44 may have corresponding fixed bolts for connecting with separate nuts.

FIGS. 5 and 6 further illustrate embodiments for the top cover plate assembly 20 and details of the internals of reactor 10. In an embodiment shown in FIGS. 2 and 5, the top cover plate assembly 20 comprises a plurality of pie-shaped plates 46 each of which may have a guide 50 and together forming a circle supporting the central hub 44, which in turn may support the optional bolting ring 48. The holes of the pie-shaped plates 46, the central hub 44, and/or the optional bolting ring 48 are aligned and connected via connectors 90. In an embodiment shown in FIGS. 4 and 6, the top cover plate assembly comprises the central hub 44 having an optional guide 50 and supporting a plurality of pie-shaped plates 46 forming a circle, which in turn supports the optional bolting ring 48. The holes of the pie-shaped plates 46, the central hub 44, and/or the optional bolting ring 48 being aligned and connected via connectors 90. In an alternative embodiment (not shown), the top cover plate assembly does not comprise the bolting ring 48, for example by bolting the pie-shaped plates 46 directly to the central hub 44.

The present disclosure can be applied to any fluid-particle contacting apparatus or process that uses extended conduits that are positioned within a containment vessel for distributing fluid into a particle bed. The vessel can be a reactor or any type of contacting vessel and this disclosure is not limited to any specific type of catalytic process or vessel arrangement. The present disclosure is useful in processes where temperature gradients or temperature fluctuations are imposed on the vessel internals, causing axial and/or radial forces and resultant stresses on internal structures.

Numerous processes use radial flow reactors to effect the contacting of catalyst with a fluid stream. These processes include hydrocarbon conversion, adsorption, and exhaust gas treatment. These reactors contain a vertically extending annular bed of particles through which the fluid flows radially in an inward or outward direction. The present disclosure may be useful in any suitable radial flow reactor such that the fluid flow in the reactor flows radially in an inward or outward direction. In an embodiment, radial flow catalytic reactor 10 in FIG. 1 is a gas phase catalytic reforming reactor operating in an inward radial flow direction through catalyst bed 24.

"Reforming" as used herein refers to the treatment of a hydrocarbon feed to provide an aromatics enriched product (i.e., a product whose aromatics content is greater than in the feed). Typically, one or more components of the feed undergo one or more reforming reactions to produce aromatics. A hydrocarbon feedstock and a hydrogen-rich gas are preheated and charged to a reforming zone containing typically two to seven reactors in series. The hydrocarbon feed stream that is charged to a reforming system may comprise naphthenes and paraffins that boil within the gasoline range.

In an embodiment is a method of operating a radial flow reactor comprising floating a top cover plate assembly within the reactor. In an embodiment, naphtha is reformed to form aromatics. The naphtha feed may be a light hydrocarbon, with a boiling range of about 70° F. to 450° F. The naphtha feed may contain aliphatic or paraffinic hydrocarbons. These aliphatic hydrocarbons are converted, at least in part, to aromatic hydrocarbons in the reforming reactor. In an optional embodiment, additional feed processing occurs to produce a feed that is substantially free of sulfur, nitrogen, metals, and other known catalyst poisons. These catalyst poisons can be removed by first using hydrotreating techniques, followed by sorbents to remove the remaining sulfur compounds. While catalytic reforming typically refers to the conversion of naphtha, other feedstocks can be treated as well to provide an aromatics enriched product. Therefore, while the conversion of naphtha is one embodiment, the present disclosure can be useful for the conversion or aromatization of a variety of feedstocks such as paraffin hydrocarbons, olefin hydrocarbons, acetylene hydrocarbons, cyclic paraffin hydrocarbons, cyclic olefin hydrocarbons, and mixtures thereof, and particularly saturated hydrocarbons.

Some of the hydrocarbon reactions that occur during the reforming operation include the dehydrogenation of cyclohexanes to aromatics, dehydroisomerization of alkylcyclopentanes to aromatics, and dehydrocyclization of acyclic hydrocarbons to aromatics. A number of other reactions also occur, including the dealkylation of alkylbenzenes, isomerization of paraffins, and hydrocracking reactions which produce light gaseous hydrocarbons, e.g., methane, ethane, propane and butane.

Operating ranges for a typical reforming process include reactor inlet temperatures between 700° F. and 1050° F.; a system pressure between 0 and 400 psig; a recycle hydrogen rate sufficient to yield a hydrogen to hydrocarbon mole ratio for the feed to the reforming reactor zone between 0.1 and 20; and a liquid hourly space velocity for the hydrocarbon feed over the reforming catalyst of between 0.1 and 10 per hour. Suitable reforming temperatures are achieved by pre-heating the feed to high temperatures that can range from 600° F. to 1800° F.

A multi-functional catalyst composite, which contains a metallic hydrogenation-dehydrogenation component selected from group 10 of the IUPAC periodic table (e.g., platinum) on a porous inorganic oxide support (e.g., bound zeolite supports or alumina supports) is usually employed in catalytic reforming. Most reforming catalyst is in the form of spheres or cylinders having an average particle diameter or average cross-sectional diameter from about 1/16" to about 3/16". Reforming catalysts may also comprise modifiers, such as rhenium, iridium, tin, germanium, chlorine, and fluorine that improve product yields or catalyst life.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Use of the term "optionally" with respect to any element of a claim is intended to mean that the subject element is required, or alternatively, is not required. Both alternatives are intended to be within the scope of the claim.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The discussion of a reference in the Description of Related Art is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A radial flow reactor comprising:
   a center pipe;
   a plurality of scallops positioned around the center pipe; and
   a floating top cover plate assembly positioned above the center pipe and the scallops,
   wherein the top cover plate assembly floats above the center pipe and the scallops, and
   wherein the top cover plate assembly floats in response to thermal expansion or contraction of the center pipe and the scallops.

2. The reactor of claim 1 wherein the top cover plate assembly is not mechanically connected to the scallops.

3. The reactor of claim 1 wherein the top cover plate assembly is not mechanically connected to the center pipe.

4. The reactor of claim 1 wherein the scallops thermally expand or contract an amount greater than the center pipe.

5. The reactor of claim 1 wherein the top cover plate assembly floats in response to cycles of thermal expansion and contraction of the reactor and a plurality of reactor internals.

6. The reactor of claim 1 wherein the top cover plate assembly floats above the center pipe in response to the greater thermal expansion of the scallops.

7. The reactor of claim 1 wherein the top cover plate assembly floats due to a difference in the thermal expansion or the thermal contraction between the center pipe and the scallops.

8. The reactor of claim 7 comprising a reactor sidewall; wherein the temperature gradient comprises a decrease in temperature from the reactor sidewall to the center pipe.

9. The reactor of claim 1 wherein the scallops thermally expand longitudinally an amount greater than the center pipe, yet a deformation of the scallops does not occur due to the top cover plate assembly floating above the center pipe.

10. The reactor of claim 1 wherein the scallops are at a higher temperature than the center pipe.

11. The reactor of claim 1 wherein the top cover plate assembly comprises a plurality of pie-shaped plates connected to a central hub.

12. The reactor of claim 11 wherein the plurality of pie-shaped plates rest atop the plurality of scallops.

13. The reactor of claim 11 wherein the pie-shaped plates are connected to the central hub with a bolting ring.

14. The reactor of claim 11 wherein the pie-shaped plates are connected to the central hub without a bolting ring.

15. The reactor of claim 12 wherein the top cover plate assembly comprises one or more guides attached to the central hub to guide the top cover plate assembly relative to the center pipe as the top cover plate assembly floats.

16. The reactor of claim 12 wherein the top cover plate assembly comprises one or more guides attached to one or more of the plurality of pie-shaped plates to guide the top cover plate assembly relative to the center pipe as the top cover plate assembly floats.

17. The reactor of claim 12 wherein the pie-shaped plates are connected to the central hub with a bolting ring, and wherein the top cover plate assembly comprises one or more guides attached to the bolting ring to guide the top cover plate assembly relative to the center pipe as the top cover plate assembly floats.

18. A radial flow reactor comprising:
    a floating top cover plate assembly;
    a center pipe: and
    a plurality of scallops,
    wherein the top cover plate assembly floats above either the center pipe or the scallops, and
    wherein the top cover plate assembly is not mechanically connected to the scallops and the center pipe.

19. A radial flow reactor comprising:
    a floating top cover plate assembly;
    a center pipe; and
    a plurality of scallops,
    wherein the top cover plate assembly floats above either the center pipe or the scallops,
    wherein the top cover plate assembly comprises a plurality of pie-shaped plates connected to a central hub, and the plurality of pie-shaped plates rest atop the plurality of scallops, and
    wherein the central hub comprises a receptacle to accommodate a lug on the center pipe.

20. A radial flow reactor comprising:
    a floating top cover plate assembly;
    a center pipe; and
    a plurality of scallops,
    wherein the top cover plate assembly floats above either the center pipe or the scallops, and
    wherein the top cover plate assembly comprises one or more guides for centering the top cover plate assembly relative to the center pipe.

21. A method of operating a radial flow reactor comprising floating a top cover plate assembly within the reactor, wherein the top cover plate assembly floats on top of a plurality of scallops and not a centerpipe when the scallops are taller than the center pipe.

22. The method of claim 21 wherein the top cover plate assembly floats on top of the center pipe and not the scallops when the center pipe is taller than the scallops.

23. The method of claim 21 wherein the top cover plate assembly is not mechanically connected to the center pipe or the scallops.

* * * * *